April 20, 1937. M. GAERTNER 2,077,406
FUEL AND PROCESS OF MAKING THE SAME
Filed April 21, 1928
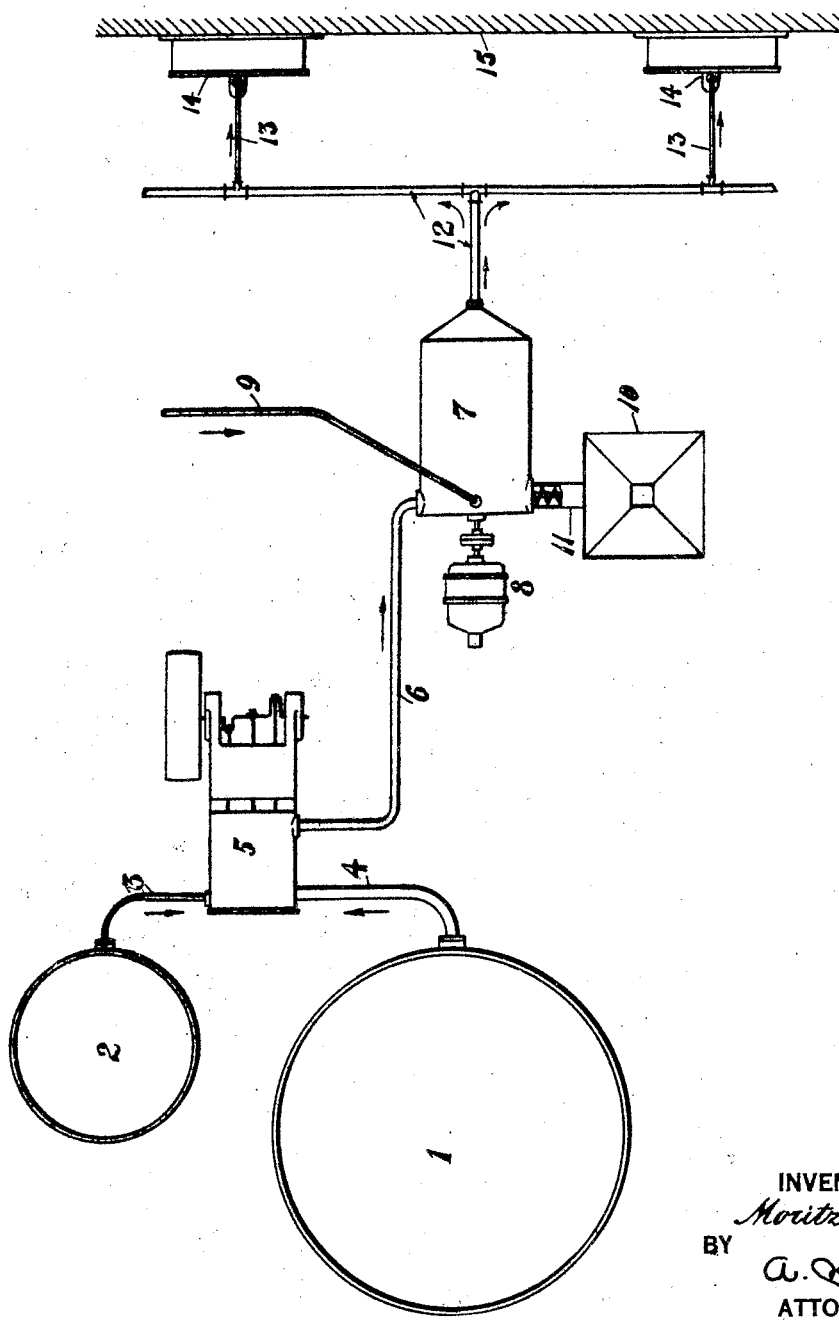
INVENTOR
*Moritz Gaertner*
BY
*A. W. Deller*
ATTORNEY Patented Apr. 20, 1937

2,077,406

UNITED STATES PATENT OFFICE 2,077,406

FUEL AND PROCESS OF MAKING THE SAME

Moritz Gaertner, Jackson Heights, N. Y.

Application April 21, 1928, Serial No. 271,707

4 Claims. (Cl. 44—8)

This invention relates to fuel and more particularly to a stable porous liquid fuel having its constitution modified by the incorporation of a gas containing oxygen in the body of the liquid in such a manner as to produce a physical structure resembling a porous honeycomb whose walls are defined by liquid fuel films and whose cells are filled with gas containing oxygen, and to a method of producing the said fuel.

Heretofore, fuels have been used in their liquid condition and have been supplied to combustion chambers by means of burners or equivalent fuel injecting means. These burners or the like produce a spray of solid droplets of the liquid fuel which are projected into a gaseous atmosphere containing oxygen. The droplets can be treated as sphere-like bodies of liquid suspended in an oxygenated gas. During the combustion of these particles, the fuel located in the surface layers of the spheres burns and forms oxides of carbon which tend to saturate the atmosphere around each particle and to dilute the oxygen to such an extent that the process of combustion proceeds with great difficulty and slowness or, in some cases, even ceases for all practical purposes. When combustion occurred under these circumstances, the thermal efficiency of the process is relatively low, and hence the cost of producing a given amount of heat is relatively expensive. Numerous efforts have been made to remedy the aforesaid defect but all suggestions merely contemplated devices or processes by which the size of the sphere-like particles can be made smaller. Even though the particle is smaller yet it is a solid droplet of liquid which is only capable of burning on the superficial surface of the droplet where oxygen is present. The fundamental defect, therefore, is still present, and no one, as far as I am aware, has overcome this defect.

I have discovered a pourous viscous fuel mass which is free from the defect noted hereinabove and which possesses advantages that will be pointed out in detail hereinafter. The new fuel may be prepared from any suitable liquid or fluid-like fuel in a simple, economic and practical manner.

Generally speaking, my invention contemplates taking a body of liquid of viscous fuel mass and treating it with a gas containing oxygen in such a manner that the body of liquid is broken up and the gas is distributed throughout the broken mass of liquid fuel in the form of a multiplicity of bubbles. In the porous mass of fuel each bubble of oxygen-containing gas is surrounded by a film of liquid. In other words, the fuel is honeycombed with myriads of small air cells which impart a porous or foam-like structure to the body of fuel.

When this fuel is to be used it is fed to the combustion chamber with the requisite amount of air for combustion purposes. Upon the ignition of the fuel the particles thereof can burn freely and completely. This is due to the fact that no matter where the particles are located, there is always an abundant supply of oxygen present which supports and maintains efficient burning of the fuel. By the use of my improved fuel in furnaces, internal combustion engines, etc., free, complete and efficient combustion occurs always because no environment of dead gas can accumulate around the slugs or droplets or other bodies of fuel. As soon as the fuel on the exterior surfaces of the bodies burns away, the air cells expand due to the elevated burning temperature and burst so that there is a dispersion of the film constituting the walls of the cells and a liberation of the air within the cells to support a further combustion of the fuel. Due to this bursting of the honeycombed fuel, a myriad of small particles of fuel are constantly being produced and an atmosphere rich in oxygen throughout the mass of burning fuel is always insured. It is apparent, therefore, that my improved fuel develops a high thermal efficiency in the process of combustion.

A satisfactory mode of procedure to prepare my improved aerated fuel is to establish a pool of liquid or viscous fuel mass within a vessel which is provided with an agitator and an air injector. With the simultaneous operation of the agitator and the introduction of air by means of the air injector, a foam or porous mass of fuel floats to the top of the liquid or fluid and can be collected at the surface of the liquid. By constantly introducing raw liquid or fluid fuel into the body of the fuel in the vessel during the operation of the agitator and the air injector, a continuous supply of aerated fuel can be obtained from an outlet at the top of the vessel. This aerated or porous fuel can be used directly or held in a storage reservoir temporarily before use.

In some instances it is desirable to add a stabilizer to the body of aerated liquid or viscous fuel mass to cause the formation of a foam-like body honeycombed with air or oxygen-containing gas which is capable of remaining for substantial periods of time after production and before consumption. There are a great variety of stabilizers or the like which can be added to give a stable, strong and persistent foam of fuel and which are effective as froth or foam strengthening agents and/or effervescing agents, as one skilled in the art will readily understand. The particular type of stabilizer will, of course, depend upon the kind of fuel, the length of time the honeycombed fuel is to be kept before use, the mode of conveying and introducing the fuel into the combustion chamber and other related conditions surrounding each individual case. Among the stabilizers effective for the aforesaid purpose are, saponin, dextrin, rosin, spirits of turpentine, wood distillates, tar derivatives, pine oil, phenols, soaps, and licorice extract.

The following specific example is given for illustrative purposes and may be readily understood by reference to the drawing which depicts somewhat schematically a system which can be used for producing my improved fuel and for incorporating an aqueous stabilizer therein.

The fuel oil supply tank 1 and water tank 2, both of which can be heated depending upon the outside temperature and on the viscosity of the oil, are connected through pipes 3 and 4 with an emulsifier 5 of any well known type. The emulsified colloid mixture of oil and water flows from emulsifier 5 through pipe 6 into an appropriate homogenizer 7 which is preferably driven directly by high speed motor 8. Air under pressure is supplied through pipe 9 into the homogenizer for the formation of foam or froth.

Very fine mesh stabilizer material in hopper 10 is passed by means of screw conveyer 10 into homogenizer 7. This material coacts with the water present in the fuel so as to stabilize the fuel oil now honeycombed with air bubbles. Main pipe 12 conducts the stable porous fuel through individual pipes 13 to burners 14 set in boiler wall 15. Of course, air is supplied in the usual manner to burners 14 or the furnace associated therewith in quantities sufficient when added to the air already incorporated in the aerated fuel to supply the necessary oxygen to completely burn the fuel, i. e., the air contains an amount of oxygen equal to that theoretically required by stoichiometry for the fuel plus an excess appropriate for the assurance of substantially complete combustion of the fuel.

The amount of water added to the fuel oil is very small and is merely sufficient to cause an effective action of the stabilizer in the finished fuel. This water, contrary to being a detriment to the fuel, is a beneficial agent due to the fact that at very high temperatures it decomposes and acts as a buffer against the attainment of temperatures so high as to be destructive of the structural materials constituting the combustion chamber, and also due to the fact that water vapor acts as a catalyst in the combustion of carbonaceous materials. Of course, if the stabilizer is soluble or partially soluble in the fuel or is capable of acting even though insoluble, then it is not necessary to utilize water in the production of the stable fuel and the viscolizing operation may be dispensed with.

It will be noted that the aforesaid results can be attained by modified procedures designed and intended to produce my improved aerated fuel and that agents other than those specifically enumerated may be employed as stabilizers, and the like. In many cases the emulsifier might be entirely dispensed with and the emulsification and aerating done simultaneously in the homogenizer of a standard or approved design. Other changes can be resorted to as one skilled in the art will readily understand. Any of the aforesaid modifications are considered to be within the purview of my invention as defined in the appended claims.

I claim:

1. A light weight, viscous fuel mass of hydrocarbon oil filled with a multiplicity of bubbles of a gas containing free oxygen not under pressure in such a manner as to produce a stable porous body which is stable in an open vessel under atmospheric conditions, said bubbles of gas being enveloped within films of said oil.

2. The process of producing a light weight, viscous fuel mass which comprises forming an emulsion of a liquid fuel and a restricted amount of an aqueous colloid and mixing air with said emulsion to produce a light weight, stable porous body having a multiplicity of air-bubbles not under pressure distributed therethrough and surrounded with films of the said fuel, the said porous body being stable in an open vessel under atmospheric conditions.

3. The process of producing a light weight, viscous fuel mass which comprises homogenizing a mass of fuel oil and a small amount of water containing a stabilizer to form a fuel emulsion, injecting air into said fuel emulsion and homogenizing the same to form a light weight, stable porous mass of fuel having multiplicity of air-bubbles not under pressure dispersed therein, the said porous body being stable in an open vessel under atmospheric conditions.

4. A light weight, viscous fuel mass which comprises a light weight, porous, stable mass of hydrocarbon oil containing a multiplicity of bubbles of air not under pressure enveloped within films of said oil, said films surrounding said air bubbles being stabilized by the presence of a stabilizer.

MORITZ GAERTNER.